Patented July 12, 1949

2,475,648

UNITED STATES PATENT OFFICE 2,475,648

POLYMERIZATION OF ETHYLENE BY DI-PEROXY-DICARBONATE ESTER CATALYSTS

George G. Stoner, Grandview Heights, and Robert L. Savage, Columbus, Ohio, assignors, by mesne assignments, to Standard Oil Company, Chicago, Ill., a corporation of Indiana No Drawing. Application March 5, 1946,
Serial No. 652,219

10 Claims. (Cl. 260—94.9)

This invention relates to the polymerization of ethylene and related olefinic compounds. Particularly it relates to novel catalysts for the polymerization of compounds containing an ethylene linkage and to polymerization processes employing said catalysts.

Numerous compounds of the most diverse chemical nature have hitherto been proposed as catalysts for the polymerization of organic compounds containing unsaturation between carbon atoms, particularly an ethylene linkage. Oxygen and peroxides, both inorganic and organic have been employed as polymerization catalysts, particularly for the polymerization of diolefins to synthetic rubbers. To obtain normally solid polymers from mono-olefins such as ethylene however, the employment of oxygen as a polymerization catalyst requires a polymerization pressure of at least 500 atmospheres and a temperature in excess of 100° C., as pointed out by U. S. Patent 2,188,465, to M. W. Perrin et al.

One object of this invention is to provide novel peroxide polymerization catalysts. Another object is to provide novel processes for the polymerization of ethylene and related olefinic compounds, which processes employ the novel peroxide catalysts heerinafter set forth. An additional object is to provide novel processes and catalysts for the polymerization of mono-olefinic hydrocarbons. A further object is to provide processes for the polymerization of mono-olefins such as ethylene to normally solid polymers, said processes being characterized by the employment of more moderate conditions of temperature and pressure than have hertofore been practicable, said processes being further characterized by the employment of diformate peroxide catalysts having the general formula

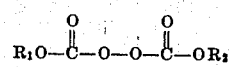

wherein $R_1$ and $R_2$ are organic radicals, especially alkyl radicals. The diformate peroxide catalysts are alternatively named di-peroxydicarbonate esters.

Yet another object of this invention is to provide a process for the polymerization of ethylene and similar olefin hydrocarbons under moderate conditions of temperature and pressure in the presence of diformate peroxide catalysts. A further object is to provide a process for obtaining solid polymers from ethylene without the necessity of employing solvents. One more object of this invention is to provide a process for the interpolymerization of ethylene or a similar olefin with other organic compounds containing an unsaturation between adjacent carbon atoms to provide normally solid interpolymers having valuable properties.

The novel polymerization catalysts of this invention are dioxydiformates (diformate peroxides) having the general formula

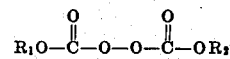

wherein $R_1$ and $R_2$ are organic radicals, which may be the same or different. A suitable method for the preparation of these catalysts comprises suspending the desired ester of chloroformic acid,

in an aqueous or non-aqueous medium, for example, water, chloroform, pentane, etc. and treating of this suspension with a peroxide, usually sodium peroxide, at a low temperature, e. g., 0° C. Suitable methods for the preparation of dialkyl dioxydiformates have been described by Wieland, et al., Annalen 446, 31–48 (1926). However, we do not limit ourselves to the Wieland methods of preparing diformate peroxides and other methods can be used for the purpose of this invention. Crude diformate peroxides can be used, but it is preferable to employ a purified peroxide such as may be obtained by selective extraction of the crude peroxide. Also, purification may be accomplished by selective extraction of impurities from the dioxydiformate diester. Alternatively we may prepare the diformate peroxide in the polymerization reactor, with or without the employment of an inert solvent and optionally in the presence of the unsaturated organic compound to be employed as the feed stock. We may prepare diethyl dioxydiformate in the polymerization zone, and even during the course of polymerization, by introducing carbethoxyazotriphenylmethyl (($C_6H_5$)$_3$C—N=N—$CO_2C_2H_5$) and oxygen or substances releasing oxygen therein.

In the general formula

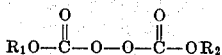

the organic radicals $R_1$ and $R_2$ can be the same or different and may, for example, be methyl, ethyl, propyl, butyl, amyl, benzyl, phenyl, tolyl, cyclopentyl, methylcyclopentyl, cyclohexyl, vinyl, allyl, propenyl or their substitution derivatives or the like. We may also use diformate peroxides wherein $R_1$ and $R_2$ make up a divalent radical.

We may also employ polymeric peroxides, e. g., of the type which can be produced by the reaction between sodium peroxide and ethylene glycol bis (chloroformate).

Diformate peroxides are generally thermally unstable and exhibit a high temperature coefficient of decomposition. A number of the diformate peroxides, e. g. dimethyl, diethyl and dipropyl diformate peroxides, are characterized by being 10% decomposed in one second at a first temperature and at least 90% decomposed in one second at another temperature which is less than 35° C. higher than said first temperature. Diethyl dioxydiformate decomposes completely and substantially instantaneously at about 35° C. At higher temperatures diethyl dioxydiformate decomposes with explosive violence. Nonetheless, we have been able to employ diethyl dioxydiformate as a polymerization catalyst for the preparation of solid polymers from ethylene at temperatures above its decomposition temperature, e. g., 55° C. It appears that the thermal stability of diformate peroxide catalysts is increased by the presence of unsaturated organic compounds or their polymers. It is possible that peroxides other than diformate peroxides are especially suitable polymerization catalysts provided that at temperatures within the polymerization temperature range they exhibit the pronounced temperature coefficient of decomposition which characterizes the diformate peroxides.

Diformate peroxides are perhaps representative of a broader class of compounds wherein a dicarbonyl peroxide

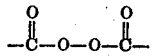

is connected by terminal valence bonds to an unsaturated grouping, i. e., a grouping containing free electrons, e. g., radicals containing sulfur, selenium, tellurium, nitrogen, phosphorus and the like, wherein the unsaturation is present at an element adjacent to a carbonyl group of the dicarbonyl peroxide.

It should be understood that we do not wish to be bound by any theory herein expressed or implied as to the mechanism by which diformate peroxides or related peroxides operate to catalyze the polymerization of organic compounds containing an unsaturation between adjacent carbon atoms, and, particularly, the polymerization of ethylene to form solid polymers.

It should not be inferred that all the diformate peroxides have precisely equivalent capacity for catalyzing the polymerization of unsaturated organic compounds, although we have observed no significant decrease in catalytic activity as the substituted group in the catalyst was changed from methyl to ethyl, propyl, butyl and amyl.

Normally between about 0.1% and about 10% by weight of diformate peroxide based on the weight of ethylene or related compound to be polymerized is employed, although some departure from this range may be necessary in certain instances. It is preferable that the actual oxygen content of the diformate peroxide which is employed fall within the range of 80 to 100% of the theoretical oxygen content of said peroxide. We have found that some of the diformate peroxides, for example diethyl dioxydiformate, decompose on standing and that the aged catalysts are not as active polymerization catalysts as freshly made preparations. Generally, an increase in the proportion of catalyst to feed stock increases the rate of polymerization, other reaction conditions remaining the same. However, excessive amounts of catalyst may result in the production of polymers of lower molecular weight than might otherwise be obtained. By way of example, a desirable catalyst concentration to use with ethylene in polymerization leading to normally solid polymers is 0.1 ml. of diethyl dioxydiformate per 60 grams of ethylene when polymerization is effected at 35° C.

Specifically it has been found that diformate peroxides catalyze the polymerization of ethylene contained in gas streams to yield solid polymers having softening temperatures above about 100° C. and ranging in properties from waxy to hard, horny, resinous materials, said polymerization being effected under mild conditions of temperature and pressure such that peroxides conventionally employed in the art of polymerizing unsaturated hydrocarbons would convert ethylene to a low molecular weight, normally liquid product. It has further been found that the polymerization of ethylene to solid polymers under mild conditions of temperature and pressure does not require the presence of a reaction solvent such as benzene, methanol, n-butanol, hexane, carbon tetrachloride, chloroform, trichloroethylene or the like, although certain solvents may be used, if desired, to facilitate handling of the reactants and products. Certain types of solvents may exert an undesirable effect in greatly decreasing the yield of solid polymer from ethylene and markedly reducing the rate of ethylene polymerization.

The ethylene feed stocks may contain other hydrocarbons, as in refinery gas streams, e. g. ethane, propane, propylene, butanes, normal and isobutylenes, etc. Under some of the polymerization conditions which may be employed, these other hydrocarbons, whose critical temperatures are considerably in excess of the critical temperature of ethylene, may be present in the polymerization reactor wholly or partly in the liquid state, facilitating the design of a continuous process for polymerizing a flowing stream of ethylene in a tubular reactor. Normally, we prefer to operate with a pure or concentrated ethylene feed stock. We have noted that as little as 10% of propylene in the ethylene charging stock markedly reduces the yield of solid polymer.

Non-hydrocarbon impurities in ethylene, for example, oxygen or sulfur and compounds of oxygen, sulfur or nitrogen, appear to operate as inhibitors or poisons for diformate peroxide catalysts, i. e., they appear to combine with part of the diformate peroxides to form inactive complexes and thus increase the catalyst requirements of the polymerization process. Commercial cylinder ethylene normally contains about 0.02% to about 0.04% of oxygen. The polymerization of ethylene containing non-hydrocarbon impurities such as a small proportion of oxygen, e. g. 0.02 weight percent of oxygen, is characterized by a relatively long induction period, e. g. 8 hours, when a small proportion of diformate peroxide catalyst, such as about 1.5 weight percent of diethyl dioxydiformate, is employed at approximately 5,000 p. s. i. reaction pressure. However, no evidence has been uncovered to indicate that non-hydrocarbon impurities reduce the molecular weight of the polymers obtained from ethylene when diformate peroxide catalysts are employed. It may be desirable to add to the ethylene or other feed stock small amounts of polymerization regulators such as tetramethylthiuram disulfide, high molecular weight mercaptans, hexachloroethane, trichloropropionitrile, etc.

We may use ethylene containing about the same content of non-hydrocarbon impurities as commercial cylinder ethylene in our process to produce solid polymers. However, in the interests of conserving catalyst, reducing or avoiding a long induction period before polymerization, and obtaining a more uniform solid polymer from ethylene, it is preferable to eliminate or at least reduce the amount of non-hydrocarbon impurities in the ethylene feed stock. Numerous methods are available in the art for eliminating non-hydrocarbon impurities, especially oxygen or oxygen compounds, from gas streams containing ethylene and need not be detailed here. A suitable method comprises careful fractional distillation of ethylene while maintaining the same out of contact with air. If desired, the ethylene feed stock may be contacted with a peroxide having low polymerization activity, for example, benzoyl peroxide, to react with oxygen, nitrogen and sulfur impurities and may thereafter be contacted with diformate peroxide catalysts under polymerization conditions of temperature and pressure to produce solid polymers.

We have purified commercial cylinder ethylene by contacting the same with sodium and sodium-potassium alloys at temperatures of 125° C. and 150° C. for periods ranging from about 2 to about 12 hours. During the purification treatment the ethylene may be maintained at about the same or a higher pressure than the desired polymerization pressure. The purified ethylene is then cooled to the desired polymerization temperature and subjected to the action of a diformate peroxide catalyst. The result of the purification treatment is to remove substantially all oxygen and sulfur from the ethylene.

The polymerization of unsaturated organic compounds with the novel catalysts of this invention is usually effected at temperatures between about 0° C. and about 100° C., although in some instances somewhat higher or lower temperatures may be desirable. The polymerization of ethylene to solid polymers can be effected at 0° C. to 100° C., but we prefer to operate at temperatures in the range of about 0° C. to about 50° C., e. g. about 35° C. The pressure in the polymerization zone may be between about 500 and about 5,000 pounds per square inch gauge, although higher pressures up to about 10,000 p. s. i. may sometimes be desirable. We have found that the polymerization of ethylene to a solid polymer proceeds readily at pressures of 5,000 p. s. i. and lower pressures. Increasing the pressure in the polymerization zone results ordinarily in an increased rate of polymerization and the production of tougher, more resinous polymers. After the polymerization has occurred, the pressure on the polymerization zone may be reduced either at the polymerization temperature or at lower temperatures. Depending upon other reaction variables and on the nature of the product desired, the polymerization period may vary from about 1 to about 50 hours or even more, e. g. 100 hours, but is ordinarily between about 10 and 50 hours, e. g. about 20 hours. The polymerization reaction mixture may be "seeded" with previously prepared polymer.

The polymerization may be effected in conventional equipment on a batch, semi-continuous or continuous basis. For continuous commercial operations it may be desirable to use a jacketed reactor containing a flight scraper, provided with suitable seals, and continuously removing solid ethylene polymers as formed.

The nature of the polymers produced by the process of this invention depends on the composition of the feed stock which is employed, the specific catalyst and the polymerization conditions. The desired products are waxy or resinous solids. Our process makes possible the production of high quality solid polymers from ethylene, which polymers soften at temperatures above about 100° C., usually at temperatures in the range of about 110° C. to about 125° C. The average molecular weight of these solid ethylene polymers (as determined by specific viscosity measurements) appears to be at least 5,000 and in some instances exceeds 20,000. By our process we have also prepared tough, resinous ethylene-acetylene interpolymers.

The normally solid ethylene polymers may be fractionally precipitated from a solvent such as hot xylene by adding antisolvents, e. g. ethanol, whereby the polymers can be separated into fractions of different average molecular weights. A solution of ethylene polymer can also be purified by filtering through an adsorbent material such as filter clay or active carbon. Solid ethylene polymers may also be purified and fractionated by molecular distillation.

The solid ethylene polymers of this invention may be used in electrical insulating compositions and moisture-proof coatings, as a substitute for various waxes in polishing and protective compositions, for molding alone or together with other plastics, etc. The solid ethylene polymers may be compounded with other plastic materials such as high molecular weight, resinous iso-butylene polymers, paraffin wax, high melting hydrocarbon waxes produced by the catalytic hydrogenation of carbon monoxide (Fischer-Tropsch synthesis) and the like. If desired, plasticizers, extenders, antioxidants, tackifiers, pigments, dyes, fillers and the like may be compounded with the solid ethylene polymers.

The following tabulation sets forth examples relating to our process. All the runs were carried out in unstirred stainless steel micro-bombs each having a capacity of about 130 or 230 cc. The bombs were carefully cleaned before use with hot xylene, acetone and pentane. The clean bombs were then cooled and diethyl dioxydiformate

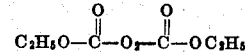

or other catalyst was added immediately before the bombs were sealed. A number of the bombs containing catalyst were connected to a manifold block and cooled in a Dry Ice-acetone solution; while cool, the bombs were evacuated, flushed with pretreated ethylene to about 200 p. s. i. and again evacuated. The next step consisted of charging the bomb with pretreated ethylene. In the runs where acetylene was also used, 25 ml. of the gaseous material (Prestolite) was drawn into the bomb prior to charging the ethylene. The ethylene employed was a purified commercial cylinder product, analyzing 98% ethylene. The loaded bombs were then weighed, and the weight of ethylene adjusted to the desired value. After the bombs had been connected to the manifold, all charging operations were carried out through previously evacuated tubing in order to reduce to a minimum the possibility of introducing oxygen into the pretreated ethylene. Concordant results in duplicate experiments indicate that the above method of charging is satisfactory.

Referring now to the table, it will be noted that the operation of Example 1 yielded ethylene polymer of high softening point. The crude polymer was dissolved in hot xylene and the solvent thereafter removed by steam distillation; the product was tough and resinous and lacked the waxy feel which is frequently encountered in solid ethylene gen, sulfur or nitrogen impurities reduce the rate of reaction appreciably unless increased amounts of catalyst are employed. The capacity of impurities in the ethylene to combine with the catalyst to yield a relatively inactive complex is illustrated by the data of Example 9. It will be noted that a reduction in the amount of catalyst resulted in no production of solid polymer even though the reaction pressure was increased from

| Example | Wt. of Ethylene | Catalyst | Pre-Treatment[4] | Vol. Cat. | Temp. | Max. Press. | Time | Wt. of Product | Conversion | M. P. of Product |
|---|---|---|---|---|---|---|---|---|---|---|
| | Grams | | Hours | Ml. | °C. | p. s. i. | Hours | Grams | Per cent | °C. |
| 1 | 60 | I | 4 | 0.1 | 35 | [1] 3,400 | 20 | 9.6 | 16 | [2] 122 |
| 2 | 60 | I | 4 | 1.0 | 35 | 1,250 | 20 | 14.4 | 24 | 102 |
| 3 | 45 | I | 4 | 1.0 | 35 | 1,200 | 20 | 4.5 | 10 | 115 |
| 4 | 58 | I | 2 | 1.0 | 35 | 4,600 | 20 | 31.0 | 53.4 | 110 |
| 5 | 45 | I | 3½ | 1.0 | 35 | 1,350 | 48 | 29.5 | 65.5 | 113 |
| 6 | 60 [5] | I | 4 | 1.0 | 35 | [1] 4,200 | 20 | 27.2 | 45.3 | [3] 105 |
| 7 | 59 [5] | I | 4.5 | 0.5 | 35 | 2,800 | 20 | 15.7 | 26.7 | [3] 115 |
| 8 | 60 | I | 0 | 1.0 | 35 | 1,250 | 20 | 8.4 | 14 | 104 |
| 9 | 60 | I | 0 | 0.1 | 35 | [1] 3,800 | 20 | 0 | 0 | |
| 10 | 60 | I | | 1.0 | 55 | 4,600 | 20 | 30.7 | 51.2 | 104 |
| 11 | 60 | I | 4.5 | 0.5 | 35 | 2,800 | 20 | 18.4 | 30.7 | [3] 113 |
| 12 | 40 (in 50 ml. pentane) | I | 3-4 | 0.5 | 35 | 1,000 | 20 | 2.1 | 5.2 | 94 |
| 13 | 30 (in 50 ml. pentane) | I | 3-4 | 0.5 | 35 | 3,800 | 20 | 1.5 | 5.0 | 98 |
| 14 | 60 | I | 3-4 | 0.42 | 35 | 4,600 | 20 | 12.0 | 20.0 | 112 |
| 15 | 60 | II | 3-4 | 0.3 | 55 | 4,400 | 20 | 24.1 | 40.2 | 108 |
| 16 | 60 | III | 3-4 | 0.4 | 35 | 3,250 | 20 | 16.6 | 27.4 | 110 |
| 17 | 60 | III | 3-4 | 0.4 | 55 | 2,200 | 20 | 10.4 | 17.3 | 102 |
| 18 | 60 | IV | 3-4 | 0.5 | 35 | 3,950 | 20 | 14.7 | 24.5 | 110 |
| 19 | 60 | IV | 3-4 | 0.5 | 55 | 4,900 | 20 | 24.0 | 40.0 | 108 |
| 20 | 55 | I | 3-4 | 0.5 | 75 | 5,000 | 20 | 9.9 | 18.0 | |

[1] Micro-bomb was connected to a Crosby recording gauge.
[2] Product softened at 122° C. did not melt to a liquid at +200° C.
[3] Product softened without melting.
[4] Pretreatment was effected by rocking ethylene with molten sodium in a bomb for the indicated period of time at 150° C., except in Example 5, where 125° C. was used.
[5] 25 ml. $C_2H_2$ were added to the ethylene.

(I) Diethyl dioxydiformate; density is 1.102 grams per ml. at 0° C.
(II) Dimethyl dioxydiformate.
(III) Dipropyl dioxydiformate.
(IV) Di-butyl dioxydiformate.

polymers. A comparison of Example 2 with Example 1 indicates that the increase in catalyst concentration improved the yield of ethylene polymer even though the reaction pressure was lower in Example 2. However, the product of Example 1 was tougher than that obtained in Example 2.

A comparison of Examples 3, 2 and 4 illustrates the effect of increasing the pressure in the polymerization zone. It will be noted that the yield of ethylene polymer increased quite sharply with increase in pressure. It should also be noted that the polymer of Example 2 has a rather low softening temperature. It will also be noted from Example 4 that 2 hours pretreatment was adequate.

A comparison of the yields of Example 5 (65.5%) with Example 2 (24%) indicates the necessity of allowing sufficient time for the polymerization. The polymer produced in Example 5 was tough, resinous and had a higher softening temperature than that of Example 2, which was a waxy material.

Examples 6 and 7 illustrate the effects of including acetylene with the ethylene feed stock at reaction pressures of 4200 and 2800 p. s. i., respectively. It appears that the inclusion of acetylene leads to a more resinous product than that normally obtained with ethylene alone, possibly through cross linkage of the polymer chains. The products derived from Examples 6 and 7 softened without melting.

A comparison of Example 8 with Example 2 illustrates the effects of pretreating the ethylene feed stock. It will be noted that under otherwise substantially identical reaction conditions, pretreating the feed stock increased the yield of solid polymer from 14 to 24%, a gain of 71%. There appeared to be no significant differences between the products of the two examples. Oxy- 1250 p. s. i. in Example 8 to 3800 p. s. i. in Example 9. Moreover, Example 9 is comparable with Example 1 wherein the same amount of catalyst and about the same reaction pressure were employed. The pretreated ethylene of Example 1 yielded 16% of solid polymer after 20 hours.

Example 10 is a run at 55° C. A good yield of product was obtained. Our studies of the rate of pressure decrease as a function of time have shown that the rate of polymerization at 55° C. is considerably greater than at 35° C.

Examples 12 and 13 illustrate the effect of a solvent in the polymerization of ethylene with a diformate peroxide catalyst. A comparison of Example 12 with Example 13 shows that about the same yield of polymer was obtained although a considerably higher pressure was employed in the latter example. The effect of pentane in eliminating the pressure sensitivity of the polymerization reaction is remarkable (note the previous comparison between Examples 2, 3 and 4 illustrating the effect of pressure on the rate of polymerization in the absence of solvent). The data of Examples 12 and 13 indicates that in the presence of a solvent such as pentane, the ethylene is actually being polymerized in solution whereas in the absence of a solvent ethylene is being polymerized from the gas phase and the reaction is therefore sensitive to pressure. A comparison of Examples 12 and 13 with Example 11 shows that under approximately similar operating conditions, the solvent reduced the solid polymer yield from about 30% to about 5%.

Examples 14 and 15 relate to the polymerization of ethylene with dimethyl dioxydiformate at 35° C. and 55° C., respectively. Examples 16 and 17 relate to the polymerization of ethylene with a dipropyl dioxydiformate catalyst. Examples 18 and 19 relate to the polymerization of ethylene with a dibutyl dioxydiformate catalyst. It will be noted that, in general, similar yields of solid polymers were obtained from ethylene under similar conditions of temperature and pressure by the employment of various homologous diformate peroxide catalysts.

An examination of the data of Example 20 indicates that catalyst deactivation proceeds at a rate which is much greater at 75° C. than at 55° C. In Example 20, there was a rather sharp pressure drop, followed by a very gradual one. The yield of solid polymer was only 18% compared to about 30% which can be obtained at 55° C. under otherwise identical operating conditions.

Having thus described our invention, what we claim is:

1. The process of catalytically polymerizing ethylene in the gaseous state with a di-peroxydicarbonate ester in an amount between about 0.01 and about 10 percent by weight, based on said ethylene, at a temperature between about 0° C. and about 100° C. and a pressure between about 500 and about 10,000 p. s. i., and separating a solid ethylene polymer.

2. The process of claim 1 wherein the di-peroxydicarbonate ester is a hydrocarbon peroxydicarbonate having the general formula

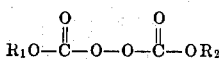

wherein $R_1$ and $R_2$ are hydrocarbon radicals.

3. The process of claim 1 wherein the di-peroxydicarbonate ester is an alkyl peroxydicarbonate having the general formula

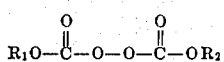

wherein $R_1$ and $R_2$ are alkyl radicals.

4. The process of claim 1 wherein the di-peroxydicarbonate ester is a cycloalkyl peroxydicarbonate having the general formula

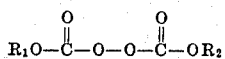

wherein $R_1$ and $R_2$ are cycloalkyl radicals.

5. The process of claim 1 wherein the temperature is between about 35° C. and about 100° C. and the pressure is between about 5000 and about 10,000 p. s. i.

6. The process of catalytically polymerizing ethylene in the gaseous state with a hydrocarbon peroxydicarbonate ester having the general formula

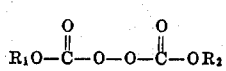

wherein $R_1$ and $R_2$ are hydrocarbon radicals, said ester being present in an amount between about 0.01 and about 10 percent by weight, based on said ethylene, at a temperature between about 35° C. and about 100° C. and a pressure between about 5000 and about 10,000 p. s. i., and separating a solid ethylene polymer.

7. The process of catalytically polymerizing ethylene in the gaseous state with an alkyl peroxydicarbonate ester having the general formula

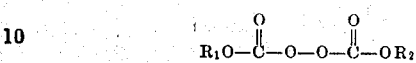

wherein $R_1$ and $R_2$ are alkyl radicals, said ester being present in an amount between about 0.01 and about 10 percent by weight, based on said ethylene, at a temperature between about 35° C. and about 100° C. and a pressure between about 5000 and about 10,000 p. s. i., and separating a solid ethylene polymer.

8. The process of catalytically polymerizing ethylene in the gaseous state with diethyl peroxydicarbonate in an amount between about 0.01 and about 10 percent by weight, based on said ethylene, at a temperature between about 0° C. and about 100° C. and a pressure between about 500 and about 10,000 p. s. i., and separating a solid ethylene polymer.

9. The process of catalytically polymerizing ethylene in the gaseous state with dipropyl peroxydicarbonate in an amount between about 0.01 and about 10 percent by weight, based on said ethylene, at a temperature between about 0° C. and about 100° C. and a pressure between about 500 and about 10,000 p. s. i., and separating a solid ethylene polymer.

10. The process of catalytically polymerizing ethylene in the gaseous state with dibutyl peroxydicarbonate in an amount between about 0.01 and about 10 percent by weight, based on said ethylene, at a temperature between about 0° C. and about 100° C. and a pressure between about 500 and about 10,000 p. s. i., and separating a solid ethylene polymer.

GEORGE G. STONER.
ROBERT L. SAVAGE.

REFERENCES CITED

The following references are of record in the file of this patent:

UNITED STATES PATENTS

| Number | Name | Date |
|---|---|---|
| 2,388,138 | Greenewalt | Oct. 30, 1945 |
| 2,370,588 | Strain | Feb. 27, 1945 |
| 2,391,920 | Peterson | Jan. 1, 1946 |
| 2,394,960 | Young | Feb. 12, 1946 |
| 2,396,785 | Hanford | Mar. 19, 1946 |

Certificate of Correction

Patent No. 2,475,648. July 12, 1949.

GEORGE G. STONER ET AL.

It is hereby certified that errors appear in the printed specification of the above numbered patent requiring correction as follows:

Column 1, line 27, for "heerinafter" read *hereinafter*; column 1, line 35, for "hertofore" read *heretofore*; columns 7 and 8, in the table, third column thereof, under the heading "Catalyst", Example 14, for the numeral "I" read *II*;

and that the said Letters Patent should be read with these corrections therein that the same may conform to the record of the case in the Patent Office.

Signed and sealed this 29th day of November, A. D. 1949.

[SEAL]

THOMAS F. MURPHY,
*Assistant Commissioner of Patents.*